US006971017B2

(12) United States Patent
Stringer et al.

(10) Patent No.: US 6,971,017 B2
(45) Date of Patent: Nov. 29, 2005

(54) AD HOC SECURE ACCESS TO DOCUMENTS AND SERVICES

(75) Inventors: Mark Stringer, Cambridge (GB); Elisabeth Soutloglou, Harlow (GB); Diana K. Smetters, Burlingame, CA (US)

(73) Assignee: Xerox Corporation, Stamford, CT (US)

( * ) Notice: Subject to any disclaimer, the term of this patent is extended or adjusted under 35 U.S.C. 154(b) by 802 days.

(21) Appl. No.: 10/063,361

(22) Filed: Apr. 16, 2002

(65) Prior Publication Data

US 2003/0196087 A1    Oct. 16, 2003

(51) Int. Cl.$^7$ ................................. H04L 9/00
(52) U.S. Cl. ..................................... 713/182
(58) Field of Search ................ 713/182, 172, 713/168, 189; 705/51

(56) References Cited

U.S. PATENT DOCUMENTS

| | | | |
|---|---|---|---|
| 5,629,980 A | 5/1997 | Stefik et al. ................ 380/4 |
| 5,638,443 A * | 6/1997 | Stefik et al. ................ 705/54 |
| 5,862,321 A | 1/1999 | Lamming et al. ......... 395/200.3 |
| 6,144,997 A | 11/2000 | Lamming et al. ........... 709/217 |
| 6,192,407 B1 | 2/2001 | Smith et al. ................ 709/229 |
| 6,314,425 B1 | 11/2001 | Serbinis et al. .............. 707/10 |
| 6,360,254 B1 | 3/2002 | Linden et al. ............... 709/219 |

FOREIGN PATENT DOCUMENTS

| | | |
|---|---|---|
| EP | 1 176 490 A | 1/2002 |
| GB | 2342195 A | 4/2000 |
| WO | 01/50229 A2 | 7/2001 |

OTHER PUBLICATIONS

Fujimura, K; Nakajima Y.: "General-purpose Digital Ticket Framework", Proceedings of the 3rd USENIX Workshop on Electronic Commerce, pp. 177-186, 1998, available on the Internet at http://www.usenix.org/publications/library/proceedings/ec98/fujimura.html.
"GoToMyPC: Making Life Simpler for Teleworkers and Travelers", Expertcity, Inc., 2001, available on the Internet at https://www.gotomypc.com/ourTechnology.tmpl.
"GoToMyPC: A Secure Remote-Access Solution", Expertcity, Inc., 2001, available on the Internet at https://www.gotomypc.com/outTechnology.tmpl.

(Continued)

*Primary Examiner*—Gregory Morse
*Assistant Examiner*—Thomas Ho (57) ABSTRACT

A document server residing on a network behind a firewall provides secure access to documents or services residing thereon. A first user outside the firewall communicates with the document server over an established first secure session to generate a token in a database of tokens on the document server. The first user digitally signs the public key of a second user and an identifier of the token. The first user transmits a URL token to the second user that identifies the location of the document server and the token identifier. When the second user outside the firewall redeems the URL token at the document server, the document server and the second user establish a second secure session. The document server authenticates the URL token against the second secure session before providing the second user with access to the document or service.

20 Claims, 5 Drawing Sheets

OTHER PUBLICATIONS

Luotonen, Ari: "Tunneling SSL Through a WWW Proxy", IETF, Internet-Draft, Mar. 26, 1997, published on the Internet at http://www.watersprings.org/pub/id/draft-luotonen-ssl-tunneling-03.txt.

"Remote-Access Technologies: A Comparison of GoToMyPC(TM) and pcAnywhere(TM)", Experticity, Inc., 2001, available on the Internet at https://www.gotomypc.com/ourTechnology.tmpl.

"Remote-Access Technologies: A Comparison of GoToMyPC(TM) and VPNs", Expertcity, Inc., 2001, available on the Internet at https://www.gotomypc.com/ourTechnology.tmpl.

SSL 3.0 Specification, Nov. 1996, available on the Internet at http://www.netscape.com/eng/ssl3/.

* cited by examiner

AD HOC SECURE ACCESS TO DOCUMENTS AND SERVICES

BACKGROUND OF INVENTION

The present invention relates generally to a method and apparatus for providing secure access to documents or services stored on a network protected by a firewall to users located outside the firewall that are not registered users of the network.

Currently many documents and services stored behind firewalls of private networks are sought to be shared with users who do not have access to the private network (i.e., are not registered users on the private network). A private network is any network that restricts access to it at its gateways or individually at each machine.

Generally, a network is coupled to other networks through gateways. A firewall is installed at a gateway to prevent unauthorized access through the gateway. For example, a private network may take the form of a corporate intranet that is coupled to a public network such as the Internet through a gateway. The gateway of the private network may have a firewall that checks messages entering or exiting the private network. Messages will pass through the firewall only if they meet predefined security criteria (e.g., come from a specified address, are directed to specified ports, etc.).

Solutions exist, such as a virtual private network (VPN), that permit a registered user of a private network to securely access the content of documents or services located inside the firewall of the private network from or through public networks. A registered user of a private network can use a VPN, for example, to access document or service located on the private network and provide them to a non-registered user of the private network. This solution proves inadequate when the documents and services located behind the firewall of a private network are dynamic (i.e., has content or features that are frequently updated) since the user of the private network must be present at the time the document or service is provided to the non-registered user of the private network.

Other solutions exist as described in U.S. patent application Ser. No. 09/270,320 (also published as GB 2 342 195 A), which disclose a system that provides secure transfer of a document referenced by a document token that is transferred from an issuer to a holder. Although the system authenticates the document token and issues the document referenced by the document token without prior knowledge of the identity of the holder of the document token, the disclosed system is susceptible to a Man-in-the-Middle attacks (e.g., where the server is convinced that an unknown host computer in the middle is the holder) and replay attacks.

Accordingly, it would be desirable to provide a user registered on a private network with the ability to grant secure controlled access to users not registered a priori on the private network to documents and services stored behind the firewall of the private network. Such access would advantageously allow the user not registered on the private network access to information and services that are dynamic.

SUMMARY OF INVENTION

In accordance with the invention there is provided a method, system and article of manufacture therefor, for a first user to provide secure access to electronic documents or services stored on a document server located on a network to a second user, where the first user is a registered user of the document server and the second user is not a registered user of the document server, and where both the first user, the second user, and the document server have each associated therewith a public key that is associated with a corresponding private key. The method performed on the document server includes: exchanging public keys with the first user to establish a first secure session; receiving from the first user a request to list a file directory; authenticating the first user's access to the file directory using credentials provided by the first user when the first secure session is established; transmitting to the first user a listing of the file directory over the first secure session; the listing identifying a set of paths to content available on the document server; exchanging public keys with the second user to establish a second secure session; receiving from the second user a request for access to selected content on the document server; the request for access including a token identifier that is recorded at the document server and associated with a path from the set of paths to the selected content available on the document server; authenticating the request for access using: (a) the public key of the second user received from the second user while establishing the second secure session, and (b) a digital signature signed using the private key of the first user that is a signed cryptographic digest of the public key of the second user and other information relating to the request for access to the selected document content on the document server (e.g., the token identifier, the path to the selected content, a creation date, access rights, etc.); providing the second user with access to the selected content over the second secure session if the request for access is authenticated.

In one embodiment, each public key is included as part of a digital certificate that is held by each party (e.g., the first user, the second user, or the document server) holding the private key associated with that certificate.

BRIEF DESCRIPTION OF DRAWINGS

These and other aspects of the invention will become apparent from the following description read in conjunction with the accompanying drawings wherein the same reference numerals have been applied to like parts and in which.

DETAILED DESCRIPTION

A. System Overview

Figure 1:
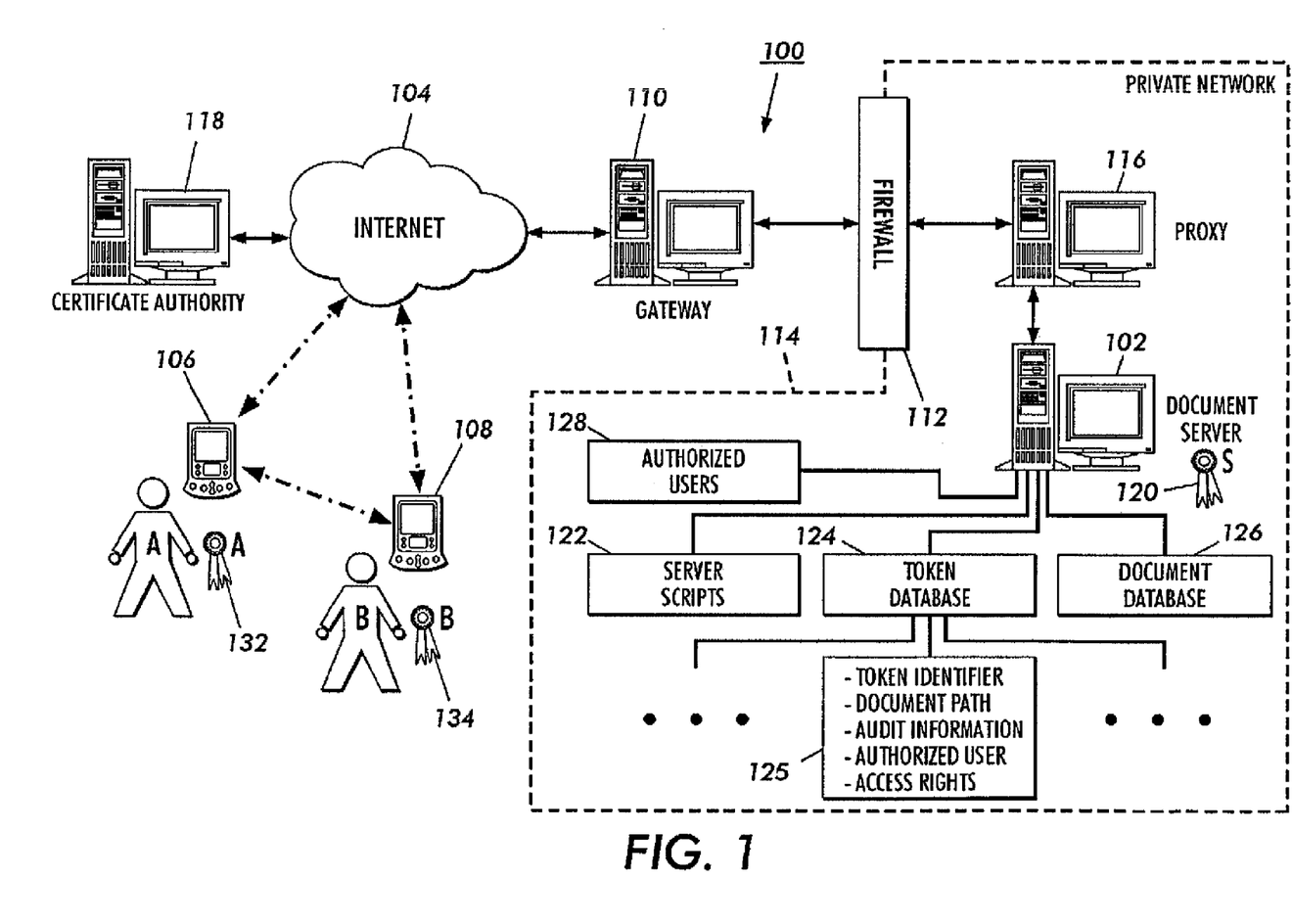
FIG. 1 illustrates an operating environment for performing the present invention.

FIG. 1 illustrates an operating environment 100 for performing the present invention. The operating environment includes a document server 102 that communicates directly or indirectly over (wired or wireless) public networks and/or untrusted networks, such as the Internet 104, with user device A 106 and user device B 108 (also referred to herein as user A and user B, respectively). The user devices 106 and 108 may be mobile or stationary computational devices, such as handheld devices, computer laptops, desktops and servers.

In one embodiment, the document server 102 communicates indirectly with the user devices 106 and/or 108 through a gateway 110 of a private network 114 (e.g., an intranet) protected by a firewall 112. In this or other embodiments, a proxy server 116 (or proxy 116) may be used to filter communications to and from the document server 102. In yet another embodiment, the document server 102 communicates directly with devices 106 and/or 108 over trusted or untrusted networks.

The operating environment 100 also includes a public key infrastructure (PKI). In the PKI, typically a certificate authority 118 or a trusted third party is used to sign digital certificates 120, 132, and 134 issued to the document server 102, user A of the device 106, and user B of the device 108, respectively. The public key infrastructure permits two parties to dynamically establish secure communications with each other without ever having a prior relationship through the use of a digital certificate.

It will be appreciated that digital certificates may for example be in the form described by the ITU X.509 digital certificate standard, which is mirrored in IETF (Internet Engineering Task Force) RFC (Request For Comment) 2459 and related documents published on the Internet at http://www.imc.org/rfc2459; alternatively, digital certificates may be in form described in the WTLS (Wireless Transport Layer Security) security layer of WAP (Wireless Application Protocol) described in publications on the Internet at www.wapforum.org, or in the form of SPKI (Simple Public Key Infrastructure) certificates described publications on the Internet at http://www.ietf.org/html.charters/spki-charter.html.

Also it will be appreciated that alternative encryptions schemes besides RSA (Rivest-Shamir-Adleman) public key encryption technology may be used to carry out the invention, such as elliptic curve cryptography or the Digital Signature Algorithm (DSA) forming part of the U.S. Digital Signature Standard (DSS).

It will be further appreciated that one or more certificate authorities may be used in the operating environment 100. For example, the private network 114 may have its own certificate authority that services certificates issued to authorized users of the network, or some or all of the parties (e.g., user A, user B, the document server) may obtain certificates from a recognized public certificate service bureau (e.g., Verisign®). Finally, it will be clear to one skilled in the art that as the document server recognizes entities to trust based on their keys, rather than who signed their digital certificates, and that arbitrary certificates, such as self-signed certificates (i.e., where the party to which the key pair belongs acts as its own certificate authority), or even unsigned public keys in isolation, may alternatively be used.

When two parties (e.g., user A and the document server) exchange their public keys and combine them with their respective private keys, both parties can agree on a symmetric secret key for a particular communications session (i.e., a session key). The session key is used to encrypt and decrypt information transmitted between the parties over an insecure (i.e., untrusted) communication channel. This manner of defining a session key does not permit an eavesdropper to deduce the session key by observing the communication channel over which the parties communicate.

One protocol for transmitting data securely over an insecure communications channel in this manner is defined in the Secure Socket Layer (SSL) protocol, as published in "The SSL Protocol Version 3.0", dated Mar. 4, 1996 and made available on the Internet at: http://www.netscape.com/eng/ssl3/. In an alternate embodiment the Internet Engineering Task Force (IETF) standard entitled Transport Layer Security (TLS), which is based on SSL, may also be used to establish a secure session over the Internet. TLS is described in IETF RFC 2246 published on the Internet at http://www.imc.org/rfc2246. The SSL 3.0 protocol and the TLS protocol, which are supported by standard web browsers, are invoked as part of the HyperText Transfer Protocol (HTTP) using the "https" extension.

In accordance with one aspect of public key infrastructures, the document server 102, user A device 106, and user B device 108 are adapted to generate digital signatures of selected content. A digital signature is a signed cryptographic digest of the selected content using a given private key. Anyone with the public key corresponding to the given private key can verify the authenticity of the signed cryptographic digest. In accordance with another aspect of public key infrastructures, the document server 102, user A device 106, and user B device 108 are adapted to define a session key for each communication session (i.e., secure session) that are established between each other.

B. Document Server

In general, the document server is adapted to provide client devices operated by users not registered on the document server (such as user B) with ad hoc secure access to documents or services behind a firewall. The client devices may be mobile devices such as PDAs (Personal Digital Assistants), smart phones, and laptops. The document server communicates seamlessly with existing browsers operating on client devices, advantageously not requiring any custom software be installed on the client devices, firewalls, or proxy servers since any special operations are downloaded by the browser in real time to the client devices on an as needed basis.

The document server 102 includes various elements that may be stored thereon or on one or more servers to which the document server 102 has communicative access. In one specific embodiment, the document server 102 is a web server that has directories and files physically located on one or more computers with which the document server communicates and has access thereon. In this embodiment, user A's directories may, for example, exist on one or more machines mapped as directories on the document server 102.

The elements of the document server 102 include server scripts (e.g., active server pages (ASPs)) 122, a token database 124, a document database 126, and an authorized user database 128. The server scripts 122 are scripts that are run in response to https requests from clients such as user devices 106 or 108. The scripts may be run on the client or server machines to perform desired actions. The document database 126 stores documents or document services (referred to herein together as content) accessible only to registered users of the private network 114.

The token database 124 records information relating to tokens issued to registered users of the private network 114. As described in detail below these tokens may take different forms. Depending on the particular form, tokens issued that are recorded in the token database 124, such as token 125, may be associated with a token ID (identifier), a user name, a document or service path, access rights, and audit information. The document or service path is the location at which an authenticated user may access documents or services in the document database 126. The audit information specifies information such as: when the token was issued, the duration the token is valid, and whether the token is valid (e.g., whether it was revoked), and how the token was used (e.g., whether it was accessed, how many times it was accessed, etc.). Access rights specify information such as: how the token may be used, the version of the document or service to which access may be given, and whether the token is delegable (i.e., transferable).

C. Secure Access to Documents or Services

By way of overview, an example scenario is described with reference to FIG. 1. User A operating the device 106 seeks to provide user B operating the device 108 access to a document or service available behind the firewall 112 of the private network 114 to which user A is a registered user (e.g., has an account) and user B is not. Thus, any attempted access by user A through the gateway 110 to the document server 102 is authenticated and may be automatically mapped to user A's settings in the private network 114 (e.g., user account, user privileges, user default directory, etc.).

Initially, user A through device 106 establishes a first secure session with the document server 102 through firewall 112 of gateway 110 and proxy 116 to access documents stored in the documents database 126 to which user A has access. User A subsequently generates a URL (Uniform Resource Locator) token that embodies a unique token ID. Generally a URL consists of three fields: (a) a protocol field (e.g., https); (b) an address field of a host computer (e.g., within the DNS (Domain Name System)), and a path field (i.e., identifies a path to a file name or service). A digitally signed cryptographic digest (referred to below in FIG. 3 as URL token signature 310) of at least the public key to whom the token is directed and other information relating to the token (e.g., the token identifier, the path, access rights, creation date) (referred to below in FIG. 3 as signature content 302), is transmitted to the document server 102 and associated in the token database 124 with the unique token ID.

The URL token is then transmitted by user A to user B, who is then free to request access to (i.e., redeem) the document or service identified by the token even though the document server is unaware of user B who is making the request for access. Advantageously, the URL token permits late binding so that the contents of the document or service are transferred to recipients at the time they desire the content (e.g., when a URL link to the content is selected), rather than having to provide a copy of the document or immediate access to the service at the time the information concerning the document or service is sent by a content provider (e.g., user A) to a specified recipient (e.g., user B).

The access by user A and user B to the document server 102 is performed using the https protocol (or another protocol that requires authentication of both parties). As part of the https protocol, SSL connections are established between the user and the server. Also as described in detail below requests for browsing documents or services on the server as well as requests for access to the documents or services using the token are in the form of a URL that is requested using the https protocol.

When a request for a document or service is made by user B, the document server 102 authenticates user B 108 as part of setting up an SSL connection, making the public key of user B known to the document server. The document server then authenticates the token ID included as part of the URL token using user A's public key (as long as user A is still an authorized user on the private network 114—e.g., exists in authorized user database 128).

D. URL Tokens with Token IDs

Figure 2:
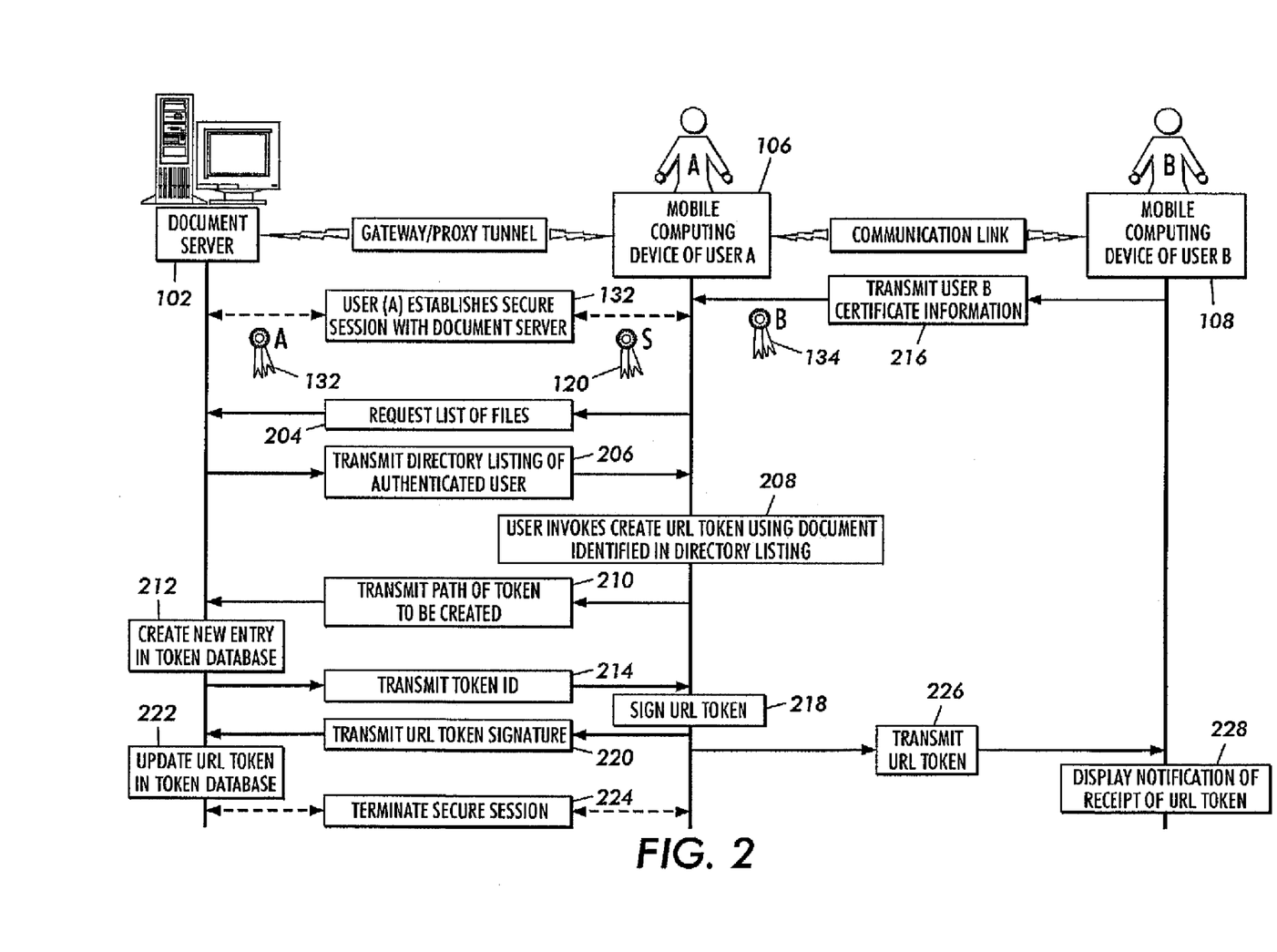
FIG. 2 illustrates one embodiment in which URL tokens may be issued from user A, who is an authorized user on the private network shown in FIG. 1, to user B who is not.

FIG. 2 illustrates one embodiment in which URL tokens may be issued from user A, who is an authorized user on the private network 114, to user B, who is not an authorized user on the private network 114. User A may begin either by communicating with the document server 102 or user B device 108 using URLs that invoke a conventional browser such as Microsoft® Internet Explorer or Netscape® Communicator. A URL selected on a user device may invoke scripts in server scripts 122 on the document server 102 that cause operations to be performed on the user device or at the document server.

In one embodiment, communication starts by user A 106 establishing a secure session at 202 with the document server 102 (using for example SSL) after, for example, a URL requesting a listing of files or services on the document server is selected at user A. In this embodiment, the browser of user A begins by establishing a secure session between the gateway 110, the proxy server 116, and ultimately the document server 102 by tunneling through the firewall 112. One method for tunneling through a firewall over an SSL connection is described by Ari Luotonen, in "Tunneling SSL Through a WWW Proxy", IETF, Internet-Draft, Mar. 26, 1997, published on the Internet at http://www.waterspring-s.org/pub/id/draft-luotonen-ssl-tunneling-03.txt, which is incorporated herein by reference. Opening the secure session between user A 106 and the document server 102 results in the exchange of digital certificates 132 and 120, respectively.

Once the secure session is established and user A is authenticated as a registered user of the document server, the request for the directory listing of files or services is received by the document server at 204. The document server operating, for example, Microsoft's Internet Information Server (IIS) maps the registered user directly onto user A's domain account of the private network 114 to provide user A with the same access privileges (i.e., rights and limitations) in the domain if user A were operating inside the firewall 112. Upon receiving the transmitted directory listing (i.e., a set of paths to documents or services to which user A has access) at 206, user A invokes a script for creating a URL token for the selected document or service from the directory listing. The script invoked may be stored on the script server 122 or alternatively it may be recorded in cache on the user device 106.

As part of creating the URL token, user A selects a path of a document or service from the set of paths received from the document server, at 208. The selected path of the document or service that the user A chooses to make available to user B is transmitted to the document server, at 210. Upon receipt of the selected path, the document server 120 creates a new entry in the token database with a unique token ID and the path of the selected document(s) or service(s), at 212. At 214, the document server transmits the unique token ID associated the token in the token database recording the selected path. Anytime before the URL token is signed at 218, user A 106 must receive digital certificate information (e.g., digital certificate 134) from user B at 216. The digital certificate information must at a minimum include the public key of user B.

Figure 3:
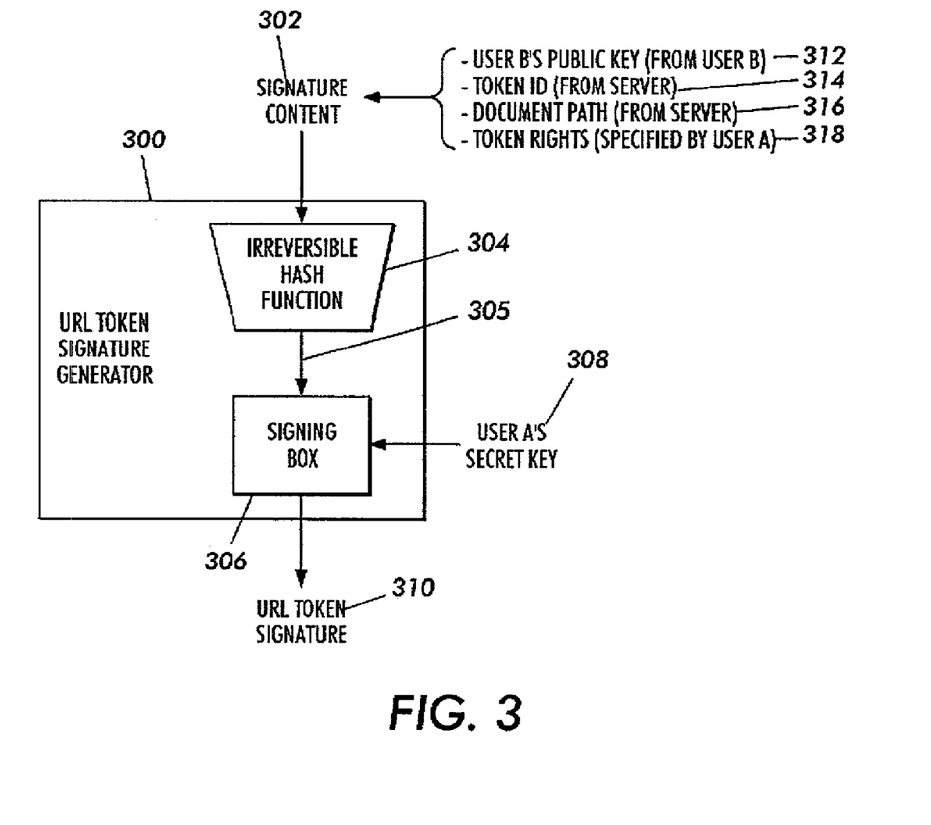
FIG. 3 illustrates one manner for user A to generate a digital signature of the URL token.

Once the public key of user B is received by user A, user B's public key and other selected content (such as the token ID) is signed by user A using the digital signature standard (DSS). FIG. 3 illustrates one known manner of implementing the DSS. In FIG. 3, a token signature generator 300 produces a URL token signature 310 (i.e., a digitally signed cryptographic digest) for signature content 302 using user A's secret key 308. The token signature generator includes a cryptographic hash function 304 and a signing box 306. One example of an cryptographic hash function 304, which has the properties of one-wayness (i.e., irreversibility) and collision-resistance, is the revised Secure Hash Algorithm (SHA-1) that is specified in the Secure Hash Standard (SHS)

which generates 160-bit hash output 305 (i.e., cryptographic digest or message digest) of message input (e.g., signature content 302). The signing box 306 in one embodiment performs the functions of the Digital Signature Algorithm (DSA). Details of the SHA-1 and the DSA that form part of the DSS are described in the U.S. Federal Information Processing Standards Publications, which are available on the Internet at http://www.itl.nist.gov/fipspubs/fip180-1.htm and http://www.itl.nist.gov/div897/pubs/fip186.htm, respectively.

In one embodiment, the signature content 302 includes user B's public key 312, and other information relating to the token such as: a token ID 314 (transmitted at 212 in FIG. 2), a document (or service) path 316 (specified at 210 in FIG. 2), and token rights 318 (which may be specified at 210 along with the path). The token rights 318 may be specified by user A anytime before signing the content and may for example include an expiry date, the number of times the document may be cashed or the duration the service may be used. Such token rights may also specify whether the token may be assigned to another individual, and billing information related to the digital property rights of the document or service. In another embodiment, the signature content includes only User B's public key 312 and the token ID 314.

Referring again to FIG. 2, once signed with the private key of user A, the URL token signature is transmitted to the document server at 220, and recorded in the token database 124 at 222, at which point the secure session terminates at 224. Anytime after user A receives the token ID, user A may transmit the URL token to user B at 226, at which point user B is notified of its receipt at 228. The URL token may be transmitted to user B by either user A or the document server 102 either directly or indirectly (e.g., IR link, email, SMS messaging, etc.). Once received, user B is free to redeem the URL. token at the document server 102 unless user A has removed the specified access or user A is no longer an authorized user of the document server 102.

In one embodiment, user A may provide to user B a URL token with the following general form:

[Secure Socket Protocol]://[Gateway Address]/[Script]/[Token ID].

A specific example of this general form is:

https://xerox.com/scripts/ValidateToken.asp?/3243394924, where "ValidateToken.asp?" is a script to be executed from the server scripts 122 and the number 3243394924 is the unique Token ID.

It will be appreciated that additional information such as the document or service name may be included as part of the URL token even though it may not be necessary for the document server 102 to uniquely identify the document token. In addition, it will be appreciated that the script in the URL token need not be explicitly recited as part of the URL but may be implied from the gateway address to which the URL is directed.

Figure 4:
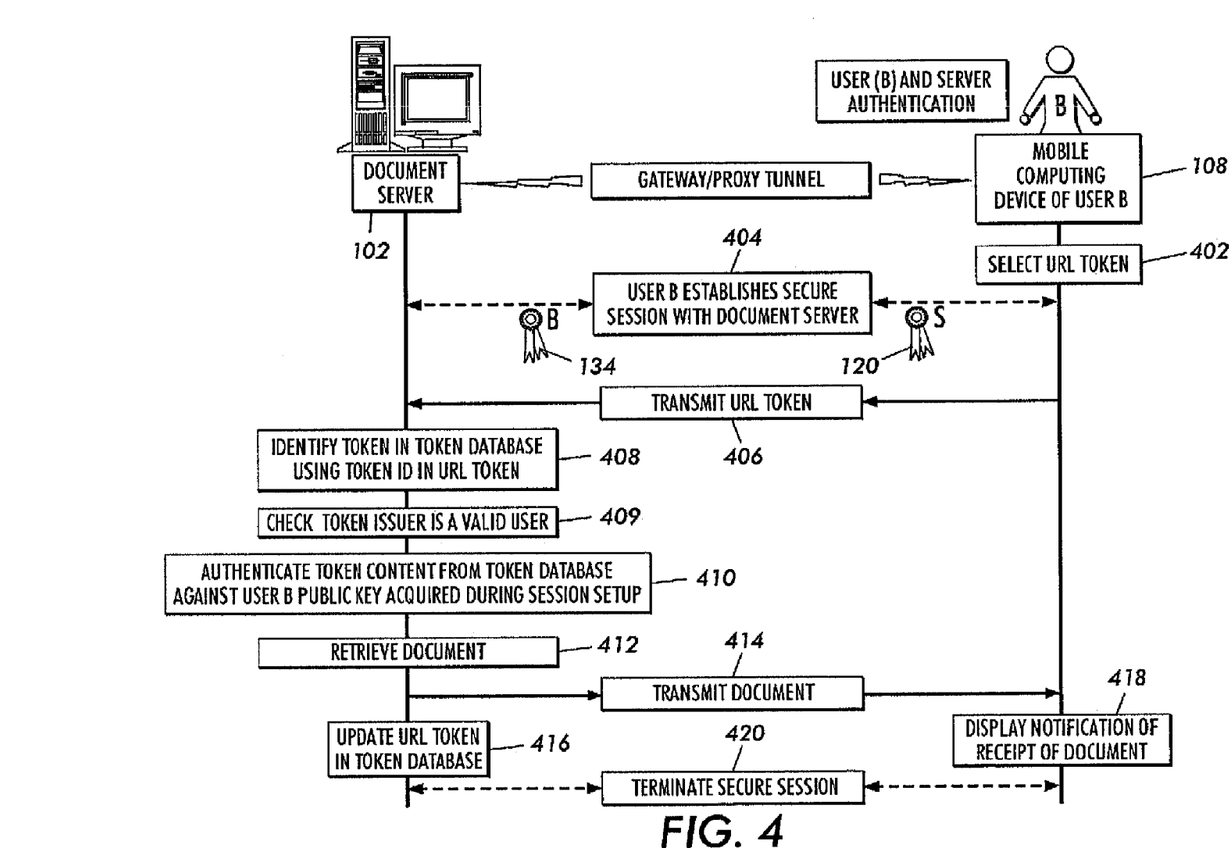
FIG. 4 illustrates one embodiment for cashing in an issued URL token.

FIG. 4 illustrates one embodiment for cashing in an issued URL token. Initially, user B 108 invokes the caching in of a URL token by selecting it at 402, by either clicking on it as a hot link or loading it in a browser's address bar on the device 108, for example. This causes the browser to begin establishing a secure session with the document server 102 at 404, which in turn results in the exchange of certificates 134 and 120, respectively.

Subsequent to establishing the secure session or as part of establishing the secure session, user B transmits the URL token to the document server at 406. Forming part of the URL token is a script identifier and a token identifier. The script identifier is used to invoke a script (or program) from the server scripts 122 that will execute instructions to identify a token in the token database 124 that corresponds to the unique token identifier forming part of the URL token and ensure the token is still valid (i.e., has not been revoked) at 408.

Once the token is identified, the certificate of the user who created the token is validated against the database of authorized users 128, at 409. The user who created the token is recorded in the token database with the token. If creator of the token is not an existing authorized user then the token is deleted or made inaccessible and user B is notified that the URL token is non-redeemable. Subsequently, using the information in the identified token, the script then authenticates the token content using the public key of user B at 410 obtained while establishing the secure session (e.g., SSL connection) at 404.

If (a) the signature content of the token can be authenticated, (b) the access rights or audit information of the token indicates that user B continues to have access (e.g., access was not revoked by user A, or the number of times or duration it was accessed was not exceeded, or the token expiry date has not past), and (c) user A is still an authenticated user at the document server, then the document is retrieved or the service is provided from the document database 126 to user B at 412 and 414, respectively. Subsequently, access right or audit information is updated in the token in the token database to reflect the access made by the user and/or billing imposed on the user, at 416. User B is notified upon receipt of the document or service over the secure session at 418 and once transmission completes the secure session is closed at 420.

Figure 5:
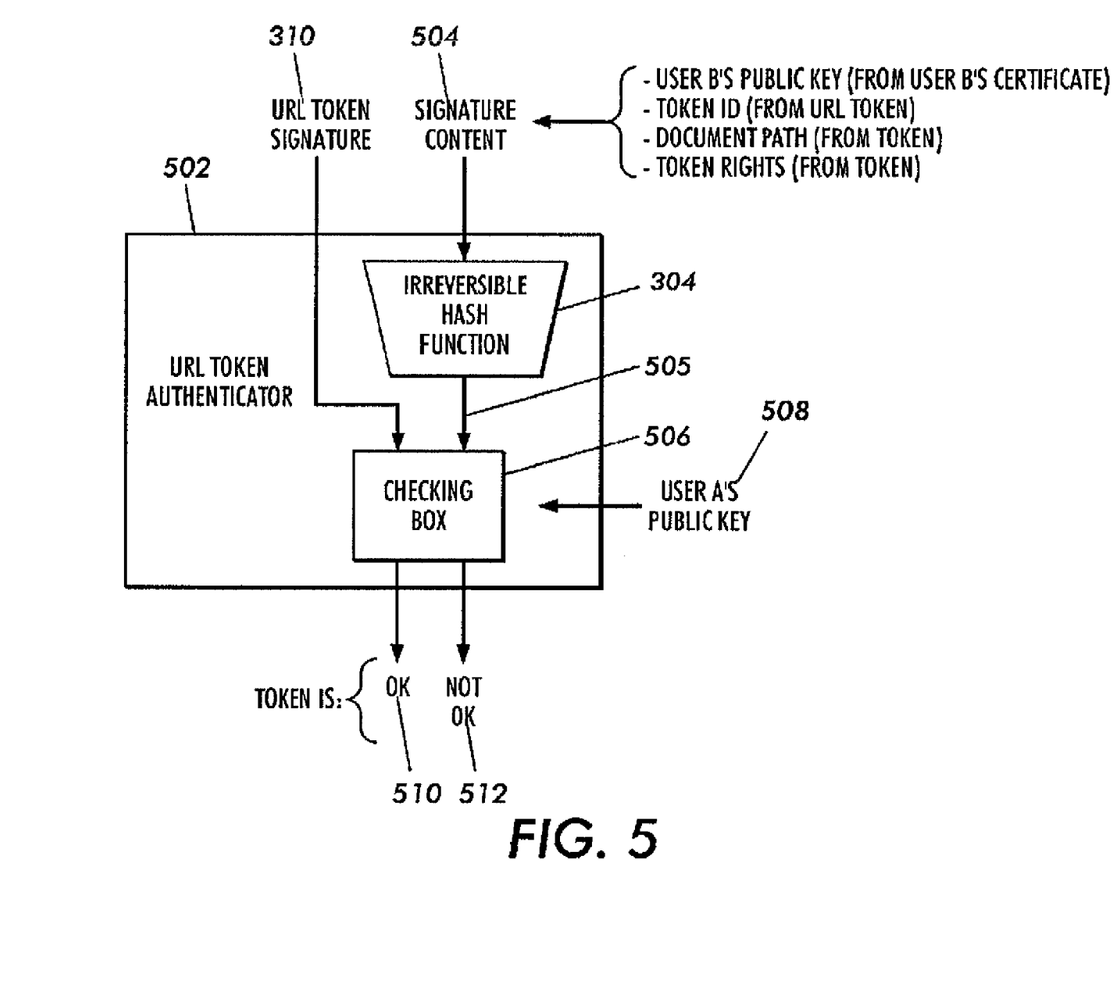
FIG. 5 illustrates one embodiment in which the request for access to a document or service may be authenticated.

FIG. 5 illustrates one embodiment in which the request for access to a document or service is authenticated at 410 in FIG. 4. In FIG. 5, a URL token authenticator 502 is shown which processes the signature content 504 using the irreversible hash function 304 (shown in FIG. 3) to produce hash output 505 (i.e., cryptographic digest). In each instance the signature content 302 and the signature content 504 are assembled, the public key of user B is obtained directly from user B and is not recorded as part of the token database 124.

The hash output 505 and the URL token signature recorded in the token database are then run through a checking box 506 to verify the authenticity of the signature content 504 using user A's public key 508 that forms a key pair with user A's private key 308 (shown in FIG. 3). The output of the authenticator is an ok signal 510 if the signature content 504 is identical to the signature content 302 (shown in FIG. 3) that was used to produce the URL token signature 310; otherwise, the output of the authenticator is a not ok signal 512.

Advantageously, URL tokens provide an ad hoc method for establishing secure access to user B to documents or services available on the document server without the document server having prior knowledge of user B. Also, this relationship is seamlessly managed without involvement from user B, by not requiring prior registration of user B as a registered user on the document server or in the private network 114. In addition, URL tokens advantageously provides user B with continuous access to documents or services that change dynamically over time (e.g., a calendar, or tax processing service), rather than a snapshot of a document issued or service releases at a particular point in time.

E. Alternate Embodiments

Those skilled in the art will appreciate that the embodiment described in section D above may be modified in a variety of ways as described below while achieving the similar or additional advantages described above. In addition, the sequence or organization of actions illustrated in the Figures are not intended to limit but depict one of many possible sequences in which the present invention may be carried out.

Referring to the arrangement shown in FIG. 2, the document server 102 and user A 106 may alternatively open and close a secure communication channel to perform the limited acts 202, 204, 206, and 224 before ever receiving certificate information (e.g., digital certificate 134) from user B at 216 and/or before ever receiving the signature of the URL token at 220. Subsequently, user A 106 signs the URL token and communicates it to user B 108. In this embodiment, the unique token ID is provided by the document server along with the directory listing at 206 or generated by user A (e.g., using a range of token identifiers pre-issued by the document server).

At a later point in time, another secure session may be established between the document server 102 and user A 106 at which point user A transmits to the document server signature of the URL token and its associated unique token identifier. Alternatively the signature of the URL token may be included as part of the URL token transmitted to user B at 226. In this alternate embodiment, the URL token would include in addition to the token identifier information that would have otherwise have been transmitted at 220 to be associated with the token identifier in the token database 124 such as the URL signature, the document path, the document rights issued. This information can all be verified by the document server upon receipt from user B by adding the information to the signature content 302 and 504 (shown in FIGS. 3 and 5, respectively).

For example in one alternate embodiment, user A may provide to user B a URL token having the following general form:

[Secure Socket Protocol]://[Gateway Address]/[Script]/[Signature]/[Rights]/[ Document Path]/[Token ID].

The rights field may contain for example the following information: (a) the expiry date of the token; (b) the number of times the token can be cashed; (c) if the document token can be passed (i.e., delegated) to another user; (d) charging and pricing information (e.g., specified for example using the ContentGuard® digital rights language XrML 2.0); (e) versions that can be accessed; (f) usage time limit; (g) the issue date.

In this embodiment user B presents the URL token signature at the time the token is redeemed because the token signature is not stored in the token database at the document server. The advantage of having user A provide the URL token signature to user B as part of the URL token is that: (a) user B is given the ability to present the URL token signature to the document server, thereby not permitting the document server to claim that user A did not actually issue the token; (b) user B is given the ability to construct a delegation certificate to delegate the token to another user (assuming such rights were granted by user A), and (c) user B is protected from non-repudiation from user A (i.e., user A cannot claim that someone else issued a token in user A's name).

Alternatively, as described in section D above, the URL token signature is stored in the token database and thus not required to be (but may be) included as part of the URL token. In yet another embodiment, user A only signs user B's public key (i.e., the signature content 302 is made up of a minimum of user B's public key). In this alternate embodiment, the token database stores the information (e.g., access rights, authorized user, document path, audit information, etc.) of the document token and the cryptographic digest of user B's public key. This embodiment assumes that anything stored in the token database is secure and reflects user A's actual intentions as communicated by user A during a secure session with the document server.

No matter which embodiment, the document server must have access to or be able to reconstruct all the information user A used in constructing the token (e.g., the access rights) before giving access to the document or service to user B, that information must be sent to the document server at some point by user A (e.g, when the token is registered), or presented by user B when the token is cashed (i.e., exercised or redeemed). The reason the document server has to be able to reconstruct all the information used by user A in making the token is that it must be able to create a bit-for-bit-identical copy of the information used to produce the cryptographic digest 505 (shown in FIG. 5), in order to verify the URL token signature 310 of user A, thereby authenticating the public key of user B and other additional information included as part of the signature content 504 used to produce the cryptographic digest (e.g., the token identifier, a creation date, access rights, etc.).

In addition, user A may provide user B along with the URL token (at 226 shown in FIG. 2) and to the document server along with signature of the URL token (at 220 shown in FIG. 2) a signed or unsigned cryptographic digest of the content or part of the content of the selected document or service (i.e., content digest). The advantages of specifying a content digest is twofold: First, providing the content digest to user B allows user B to verify the document or service it receives from the document server (at 418 shown in FIG. 4) is that what user A intended user B to receive when user A issued the URL token to user B.

Second, providing the content digest to the document server permits user A to specify to the document server that user B's access to the document or service is limited to particular states of the document or service (e.g., pre-release versus released) or that access to the document or service include or exclude certain elements (i.e., early, late, or select binding of the document or service referenced in the URL token to the document content on the document server).

In one embodiment, the content digest may be included with access rights information specified in the signature content 302 (shown in FIG. 3). For example, the access rights information may include: a digest of the current contents of a file representing the selected document or service, or a version number that indicates a particular state of the file at a particular point in time as maintained by a version control system operating on the document server. The version number may represent, for example, the current version, a past version, or a future version of the selected document or service.

In yet a further embodiment, the document server may be used to distribute secure access to documents and services using the URL tokens by email to recipients whose public keys are known.

In yet another embodiment, user A is provided mechanisms for audit and revocation (or modification) of access to issued URL tokens. That is, user A can access at any time the token database 124 using scripts in the server scripts 122 using a browser. Browsing the token database permits user A to identify which tokens have been redeemed as well as other audit information such the frequency a token is redeemed, the last time it was redeemed, the duration a token is redeemed (e.g., with a service). Browsing the token database also permits user A to revoke issued URL tokens or refresh expiry information of issued URL tokens.

In one embodiment, user A and user B establish a secure session with the document server by performing the following acts: (1) the gateway 110 opens a socket on a selected port to wait for a connection from the proxy 116; (2) the gateway 110 opens a socket on a different or the same port to wait for connections from a user device; (3) the proxy 116 connects to the gateway 110 on a selected port via the firewall proxy 112; (4) the gateway 110 verifies the proxy's internet address is valid; (5) the user device connects to the gateway 110 by establishing an SSL connection with the document server 102; (6) the gateway 110 directs data received from the user device to the proxy 116 and the proxy 116 directs the data to the document server 102; (7) the proxy 116 directs data received from the document server 102 to the gateway 110, and the gateway 110 directs the data back to the user device; (8) acts (6) and (7) are repeated while the user device is communicating with the document server.

F. Miscellaneous

To recapitulate, the present invention permits ad hoc secure access to specific documents or services stored behind a firewall without compromising security. This permits authorized users of a secure network (e.g., domain) to share specifically identified documents and or services (i.e., on a transaction by transaction basis or per-issue basis) only available to the authorized users behind the firewall of the secure network with third parties who re not authorized users of the secure network. Access to the documents or services is actively managed by the document server and the authorized users by providing access to the secure network's documents or services whenever necessary via the token database, thereby providing a mechanism for reviewing monitoring, and revoking such access (e.g., on demand, after a period of time, after a predefined number of accesses, or subject to other predefined conditions).

Additional information concerning token-enabled mobile computing devices is further described in the following U.S. Patent and Patent Applications, which are all hereby incorporated herein by reference: U.S. Pat. Nos. 5,862,321 and 6,144,997 (entitled: "System and Method for Accessing and Distributing Electronic Documents"); U.S. patent application Ser. No. 09/118,322 (entitled: "Token-Based Document Transactions"); U.S. patent application Ser. No. 09/270,641 (entitled "System For Generating Context-Sensitive Hierarchically Ordered Document Service Menus"); U.S. patent application Ser. No. 09/270,320 (entitled "Secure Token-Based Document Server"); U.S. patent application Ser. No. 09/270,451 (entitled "Mobile Email Document Transaction Service"); and U.S. patent application Ser. No. 09/270,645 (entitled "Mobile Document Paging Service").

Using the foregoing specification, the invention may be implemented as a machine (or system), process (or method), or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for a first user to provide secure access to electronic documents or services stored on a document server located on a network to a second user, where the first user is a registered user of the document server and the second user is not a registered user of the document server, and where both the first user, the second user, and the document server have each associated therewith a public key that is associated with a corresponding private key, the method performed on the document server comprising:

exchanging public keys with the first user to establish a first secure session;

receiving from the first user a request to list a file directory; authenticating the first user's access to the file directory using credentials provided by the first user when the first secure session is established;

transmitting to the first user a listing of the file directory over the first secure session; the listing identifying a set of paths to content available on the document server;

exchanging public keys with the second user to establish a second secure session;

receiving from the second user a request for access to selected content on the document server; the request for access including a token identifier that is recorded at the document server and associated with a path from the set of paths to the selected content available on the document server;

authenticating the request for access using: (a) the public key of the second user received from the second user while establishing the second secure session, and (b) a digital signature signed using the private key of the first user that is a signed cryptographic digest of the public key of the second user and other information relating to the request for access to the selected document content on the document server; and providing the second user with access to the selected content over the second secure session if the request for access is authenticated.

2. The method according to claim 1, further comprising:
receiving from the first user a request to create a token that is associated with the path to the selected content available on the document server;
creating the token in a database of tokens on the document server; the token having associated therewith the token identifier; and
transmitting to the first user over a secure session the token identifier that uniquely identifies the token in the token database.

3. The method according to claim 2, further comprising:
receiving from the first user over the first secure session the path from the set of paths identifying selected content available on the document server;
transmitting to the first user the token identifier over the first secure session;
the token identifier being associated with the path to the selected content available on the document server; and
receiving from the first user over the first secure session the digital signature of the signed cryptographic digest of the public key of the second user and the token identifier.

4. The method according to claim 3, wherein each public key forms part of a digital certificate.

5. The method according to claim 3, further comprising receiving over a third secure session a request from the first user to modify access rights recorded with the token in the token database.

6. The method according to claim 2, receiving from the first user over a third secure session the digital signature of the signed cryptographic digest of the public key of the second user and the other information relating to the request for access to the selected document content on the document server.

7. The method according to claim 2, wherein the digital signature signed by the private key of the first user is received with the request for access to the selected content available on the document server from the second user.

8. The method according to claim 2, wherein the cryptographic digest signed using the private key of the first user includes a cryptographic digest of all or portions of the selected content.

9. The method according to claim 2, wherein the other information relating to the request for access to the selected document content on the document server includes one or more of the token identifier, a creation date of the token, access rights to the selected content, all or portions of the selected content, and a version number of the selected content.

10. The method according to claim 1, wherein the request for access is specified using a secure hypertext transfer protocol that includes a gateway address, the digital signature, and the path of the selected content available on the document server.

11. The method according to claim 1, wherein the document server is located on an intranet protected by a firewall and wherein the first secure session and the second secure session tunnel through the firewall.

12. The method according to claim 1, wherein the other information relating to the request for access to the selected document content on the document server is one of the token identifier, the path from the set of paths to the selected content available on the document server, and access rights to the selected document content, and wherein the selected content is one of a document and a service available on the document server.

13. An article of manufacture for use in a machine, comprising:
a memory;
instructions stored in the memory for a method in which a first user provides secure access to electronic documents or services stored on a document server located on a network to a second user, where the first user is a registered user of the document server and the second user is not a registered user of the document server, and where both the first user, the second user, and the document server have each associated therewith a public key that is associated with a corresponding private key, the method comprising:
exchanging public keys with the first user to establish a first secure session;
receiving from the first user a request to list a file directory; authenticating the first user's access to the file directory using credentials provided by the first user when the first secure session is established;
transmitting to the first user a listing of the file directory over the first secure session; the listing identifying a set of paths to content available on the document server;
exchanging public keys with the second user to establish a second secure session;
receiving from the second user a request for access to selected content on the document server; the request for access including a token identifier that is recorded at the document server and associated with a path from the set of paths to the selected content available on the document server;
authenticating the request for access using: (a) the public key of the second user received from the second user while establishing the second secure session, and (b) a digital signature signed using the private key of the first user that is a signed cryptographic digest of the public key of the second user and other information relating to the request for access to the selected document content on the document server; and
providing the second user with access to the selected content over the second secure session if the request for access is authenticated.

14. The article of manufacture according to claim 13, wherein the method further comprises:
receiving from the first user a request to create a token that is associated with the path to the selected content available on the document server;
creating the token in a database of tokens on the document server; the token having associated therewith the token identifier; and
transmitting to the first user over a secure session the token identifier that uniquely identifies the token in the token database.

15. The article of manufacture according to claim 14, wherein the method further comprises:
receiving from the first user over the first secure session the path from the set of paths identifying selected content available on the document server;
transmitting to the first user the token identifier over the first secure session;
the token identifier being associated with the path to the selected content available on the document server; and receiving from the first user over the first secure session the digital signature of the signed cryptographic digest of the public key of the second user and the token identifier.

16. The article of manufacture according to claim 13, wherein the other information relating to the request for access to the selected document content on the document server is one of the token identifier, the path from the set of paths to the selected content available on the document server, and access rights to the selected document content, and wherein the selected content is one of a document and a service available on the document server.

17. A document server for performing a method in which a first user provides secure access to electronic documents or services stored on the document server located on a network to a second user, where the first user is a registered user of the document server and the second user is not a registered user of the document server, and where both the first user, the second user, and the document server have each associated therewith a public key that is associated with a corresponding private key, the document server comprising:

a memory for storing instructions; and a processor coupled to the memory for executing the instructions of the document server; the processor in executing the instructions:

exchanging public keys with the first user to establish a first secure session;

receiving from the first user a request to list a file directory; authenticating the first user's access to the file directory using credentials provided by the first user when the first secure session is established;

transmitting to the first user a listing of the file directory over the first secure session; the listing identifying a set of paths to content available on the document server;

exchanging public keys with the second user to establish a second secure session;

receiving from the second user a request for access to selected content on the document server; the request for access including a token identifier that is recorded at the document server and associated with a path from the set of paths to the selected content available on the document server;

authenticating the request for access using: (a) the public key of the second user received from the second user while establishing the second secure session, and (b) a digital signature signed using the private key of the first user that is a signed cryptographic digest of the public key of the second user and other information relating to the request for access to the selected document content on the document server; and providing the second user with access to the selected content over the second secure session if the request for access is authenticated.

18. The document server according to claim 17, wherein the processor in executing the instructions executes instructions for:

receiving from the first user a request to create a token that is associated with the path to the selected content available on the document server;

creating the token in a database of tokens on the document server; the token having associated therewith the token identifier; and transmitting to the first user over a secure session the token identifier that uniquely identifies the token in the token database.

19. The method according to claim 18, wherein the processor in executing the instructions executes instructions for:

receiving from the first user over the first secure session the path from the set of paths identifying selected content available on the document server;

transmitting to the first user the token identifier over the first secure session;

the token identifier being associated with the path to the selected content available on the document server; and receiving from the first user over the first secure session the digital signature of the signed cryptographic digest of the public key of the second user and the token identifier.

20. The method according to claim 17, wherein the other information relating to the request for access to the selected document content on the document server is one of the token identifier, the path from the set of paths to the selected content available on the document server, and access rights to the selected document content, and wherein the selected content is one of a document and a service available on the document server.

* * * * *